Aug. 9, 1927.

J. GRANTER ET AL 1,638,628

AUTOMOBILE SIGNAL DEVICE

Filed Dec. 1, 1926      2 Sheets-Sheet 1

INVENTOR.
JACOB GRANTER.
JACOB DAVIS.
BY
Townsend, Loftus and Abbett
ATTORNEYS.

Aug. 9, 1927.  
J. GRANTER ET AL  
1,638,628  
AUTOMOBILE SIGNAL DEVICE  
Filed Dec. 1, 1926   2 Sheets-Sheet 2
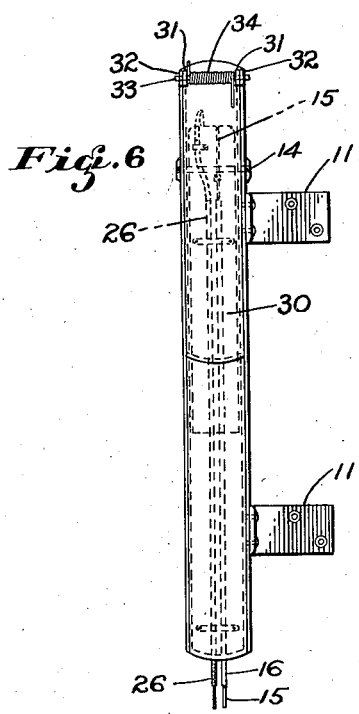
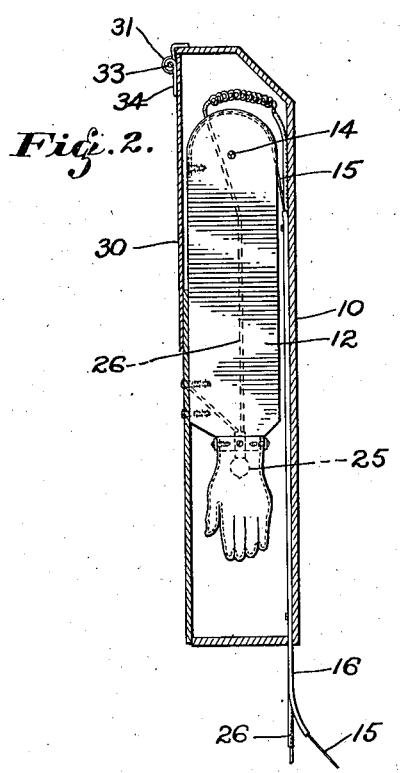
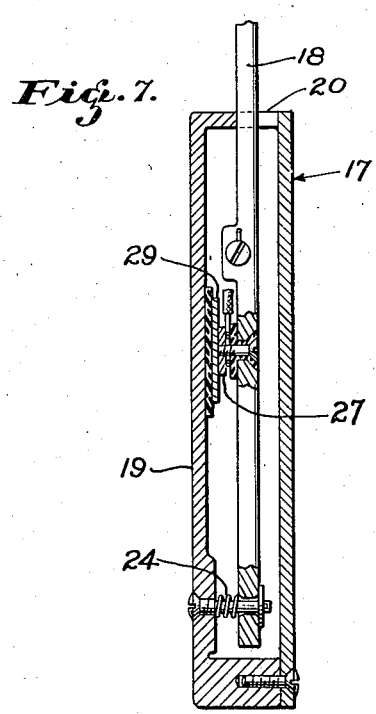
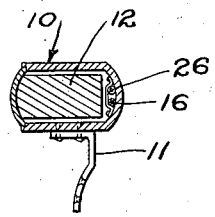
INVENTOR.  
JACOB GRANTER.  
JACOB DAVIS.  
BY  
Townsend, Loftus and Abbett  
ATTORNEYS.

Patented Aug. 9, 1927.

1,638,628

UNITED STATES PATENT OFFICE.

JACOB GRANTER AND JACOB DAVIS, OF OAKLAND, CALIFORNIA.

AUTOMOBILE SIGNAL DEVICE.

Continuation of application filed April 6, 1925, Serial No. 21,236. This application filed December 1, 1926. Serial No. 151,848.

This application is a continuation of an application filed by us on or about the 6th day of April, 1925, entitled Automobile signaling device.

This invention relates to a direction indicator particularly adapted for use on automotive vehicles.

It is the principal object of the present invention to generally improve and simplify devices of the character referred to whereby to provide a simple and inexpensive device which may be installed at the side of the vehicle and operated by the driver to visibly indicate to others in the front or rear of the vehicle the intended direction of travel of the vehicle.

In carrying out this object we provide a casing adapted to be secured at the side of the vehicle. The design of the casing is such that it does not detract from the appearance of the vehicle. This casing encloses a semaphore arm which may be operated by the driver and extended to different signaling positions to indicate the intended direction of travel of the vehicle.

One form which the invention may assume is exemplified in the following description and illustrated by way of example in the accompanying drawings, in which:

Fig. 2 is a view in vertical section through the casing and semaphore arm disclosing certain details of construction.

Fig. 5 is a plan section through the casing disclosing the manner in which the closure members nest within the side of the casing.

Fig. 6 is a view in front elevation of the operating device disclosing certain features of its construction.

Fig. 7 is a vertical section through the operating device which is mounted on the dash board of the vehicle to control the semaphore arm, with parts broken away and shown in section to more clearly disclose certain features of construction.

Figure 1:
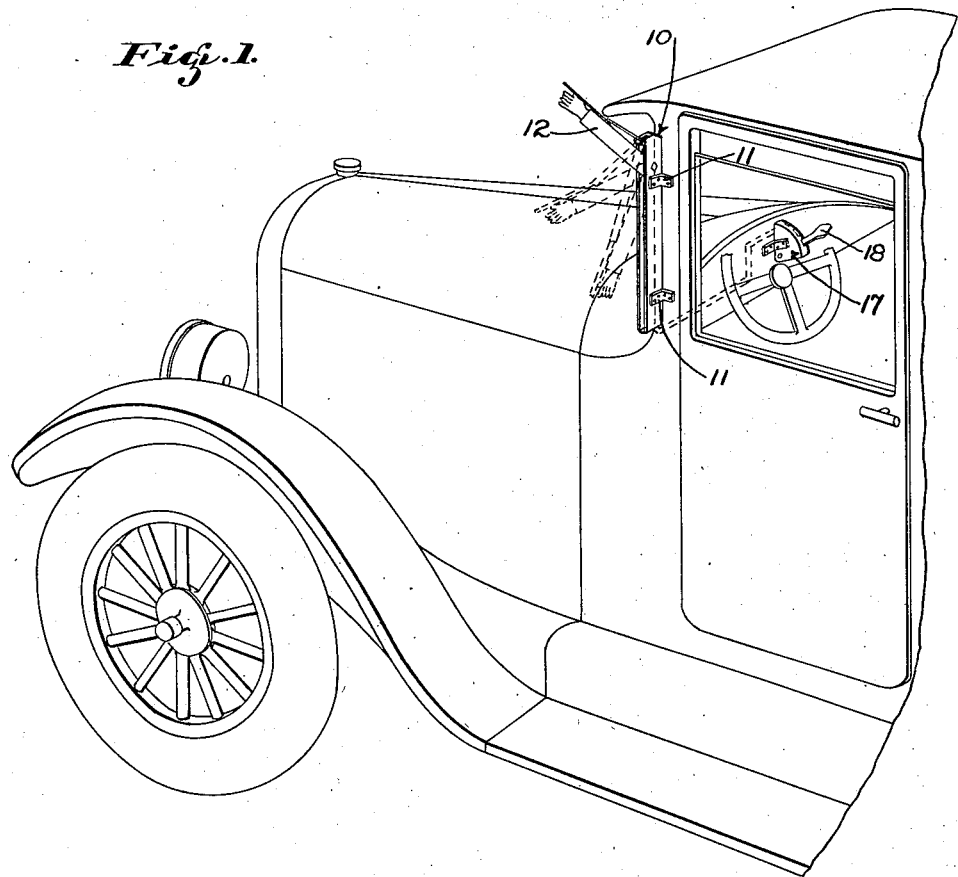
Fig. 1 is a perspective view disclosing the preferred form of our invention as mounted at the side of a vehicle, and disclosing the manner in which the semaphore arm extends to different signaling positions.
Figures 3, 4:
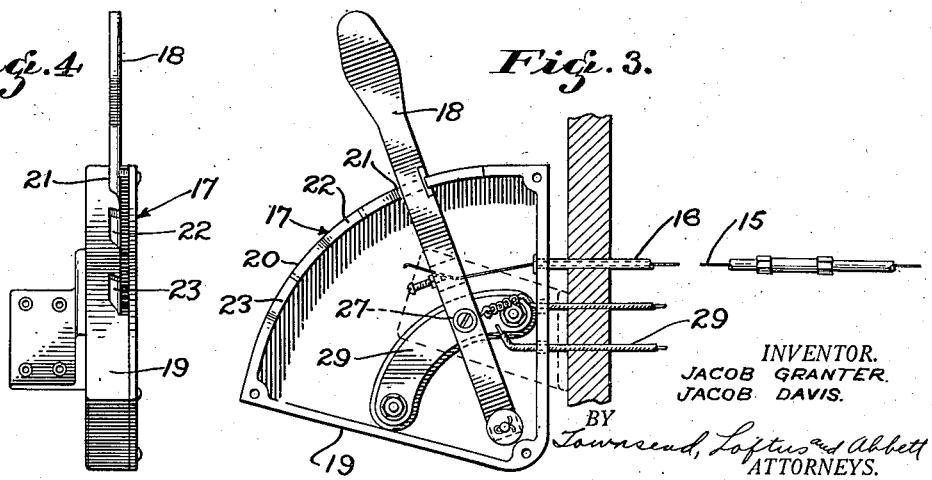
Fig. 3 is a view of the operating device which is mounted on the dashboard of the vehicle to control the semaphore arm.
Fig. 4 is a view in elevation of the exterior side of the casing.

Referring more particularly to the accompanying drawings, 10 indicates an elongated rectangular housing which is adapted to be mounted in a vertical position at the side of a vehicle adjacent the front end of the body thereof as disclosed in Fig. 1. For this purpose the casing 10 is provided with brackets 11 which are secured to one side of the casing and extend at right angles thereto, so that they may be connected with the side of the vehicle by screws or other suitable means.

The housing or casing 10 may be finished exteriorly to match the finish of the vehicle upon which it is mounted, so that it will not detract from the appearance of the vehicle.

Mounted within the housing or casing 10 is a semaphore arm 12, which is pivotally mounted at its upper end on a pin 14 which extends transversely between the front and rear walls of the housing 10. The semaphore arm 12 has a substantially semi-circular upper end which is grooved circumferentially and concentric with respect to the pivot pin 14. At the base of the circular portion at the exterior side of the semaphore arm a cable 15 is secured by means of a screw. This cable is led over the grooved circular portion of the arm and is led through tubing 16 secured along the inner vertical wall of the housing. This tubing 16 leads to an operating device 17.

This device may be arranged on the instrument board of the vehicle adjacent the steering wheel so that the driver may have access thereto. The flexible tubing or conduit 16 extends between the operating device 17 and the casing 10, so that the flexible cable 15 may be fully protected and reciprocated through the conduit 16 if desired.

The end of the cable 15 entering the operating device 17 is secured to a pivotal lever 18 at a point intermediate the ends of the latter. One end of this lever 18 is pivoted within a casing 19 of the operating device 17, so that it may be oscillated to operate the semaphore arm 12 through the medium of the cable 15.

The housing 19 of the operating device 17 is formed with an arcuate rim 20 having three notches 21, 22 and 23. The movement of the arm from its normal position to the notch 21 is sufficient to draw the cable through the conduit an amount necessary to swing the semaphore arm 12 outwardly to a position indicating stop. In this position the arm will be suspended outwardly and downwardly. If the lever is engaged with the notch 22, the semaphore arm 12 will be disposed in a horizontal position indicating that the driver is about to negotiate a left-hand turn. If the lever 18 is engaged with the notch 23, the arm will be elevated from the horizontal position to indicate that the driver of the vehicle is about to negotiate a righthand turn.

The operating lever 18 is slidable along its pivot pin and an expansion spring 24 is disposed intermediate one side of the casing 19 and the operating lever 18 to constantly tend to force the arm into engagement with the notches 21, 22 and 23, or to hold the same engaged with the notch when the lever is moved to a position engaging a notch. When the lever is in an inoperative position, the spring will cause it to bear tightly against the edge of the rim 20 to secure it in such a position.

At the lower end of the semaphore arm 12 a simulation of a human hand is formed. This hand is hollow and is formed of translucent material, and is fitted interiorly with a light bulb 25. It is intended that each time the semaphore arm is operated that the light bulb be automatically illuminated to illuminate the hand.

To accomplish this one side of the light bulb is grounded into the frame of the automobile or vehicle. The other terminal of the bulb is connected with a wire 26 which is led through a flexible conduit to the operating device 17 wherein it connects with a wiper 27 mounted on and insulated from the lever 18. When the lever is placed in engagement with either of the three notches, the wiper 27 engages a contact plate 29 mounted interiorly of the housing 19 of the operating device 17 and insulated therefrom. This contact plate 28 is connected by a conductor 29 to one terminal of a battery, which may be the battery of the automobile upon which the device is mounted. The other terminal of the battery is grounded.

Therefore, when the lever 18 is thrown into operative position to operate the semaphore arm 12, a circuit will be completed from the battery to the contact plate 28; thence through the wiper 27 to the light bulb 25. As the other terminal of the light bulb is grounded a circuit will be completed back to the battery.

One of the features of the present invention is the fact that the housing or casing 10 is substantially water-proof due to its novel construction. That is, the front, side and rear walls together with the top and bottom sections are tightly joined so as to be water-proof.

At the exterior side a cover plate is formed which forms a closure for the exterior side of the housing through which the semaphore arm oscillates. This cover plate comprises an upper section 30 which has two outwardly projecting ears 31 at its top. These ears are located at opposite sides of the section 30 and are arranged between ears 32 formed integral with the sides of the housing 10 and extending outwardly therefrom. A transverse pin 33 extends through the ears 31 and 32 to form a pivotal mounting for the section 30 of the closure. A spring 34 is arranged about the pin 33 and is intended to bear against the upper section 30 of the cover plate and constantly tend to maintain the same in closed position. The upper section of the cover plate of the housing is substantially half the length of the housing. It is necessary that the cover plate be in two parts due to the different relative pivotal points of the closure plates and the semaphore arm. The lower section of the closure plate is secured to the semaphore arm as shown in Fig. 2. The meeting edges of the sections of the cover plate are cut at an angle as shown in Fig. 2, so that a water-tight joint will be formed.

When the arm 12 is swung outwardly the sections of the cover portions will be simultaneously swung out. Due to the difference in pivotal points of the arm and the upper cover section, the latter will overlap the lower cover section when the arm is extended as illustrated in Fig. 1. The beveled meeting edges of the cover sections permit such movement.

Reference being had to Fig. 5 it will be noticed that the front and rear walls of the casing are formed with longitudinal recesses at their outer edges. These recesses occur at the inner surfaces of the walls, and are adapted to accommodate the edges of the cover sections. In other words, the outer edges of the front and rear walls of the casing will overlap the edges of the cover sections, so that when driving against the wind there will be no tendency for the cover sections to be drawn outwardly by the wind. This is quite an advantage as it prevents the cover plates from rattling. It will be noticed that the cover sections are arcuate in cross section, so that the wind will have a tendency to maintain the cover closed rather than opened.

It is obvious that when the semaphore arm is swung inwardly the cover sections will swing inwardly therewith and will unite to form a complete closure for the housing, concealing the semaphore arm from view and protecting it from the elements.

In operation of the device, when it is desired to indicate that the vehicle is about to turn to the left, the lever 18 is brought into register with the notch 22. This movement of the lever 18 will impart sufficient movement through the cable 15 to swing the semaphore arm to a horizontal position, indicating that the vehicle is about to make a left turn. At the same time a circuit will be completed through the light bulb 25 to illuminate the hand.

When it is desired to indicate that the vehicle is to turn to the right, the lever 18 is brought into register and engaged with the notch 23. This will impart sufficient movement through the cable to the semaphore arm to elevate the latter above a horizontal position, indicating that the vehicle is about to negotiate a right-hand turn.

When desired to indicate that the vehicle is to come to a stop, the lever 18 is brought into register and engaged with the notch 21. This will dispose the arm in a depending position indicating that the vehicle is to come to a stop.

It is manifest that in either of its operating positions the hand of the semaphore arm 12 will be automatically illuminated. Likewise, that the cover plate for the side of the housing through which the arm oscillates will open when the arm is extended and will form a weather-tight closure for the housing immediately when the arm is returned to a point within the housing 10.

From the foregoing it is obvious that we have provided a simple and inexpensive automobile direction indicator, which will be positive in operation and which may be easily and quickly actuated prior to negotiating a turn, and which will remain in operating position while making the turn so that the driver may pay full attention to the operation of the car.

It is also manifest that the operating parts of the mechanism will be fully protected due to the provision of the closing members which automatically form a closure for the housing when the semaphore arm is returned to inoperative position.

While we have shown the preferred form of our invention, it is to be understood that various changes may be made in its construction by those skilled in the art without departing from the spirit of the invention, as defined in the appended claims.

Having thus described our invention, what we claim and desire to secure by Letters Patent is:

1. A direction indicator of the character described comprising a housing adapted to be arranged at the side of a vehicle, a semaphore arm pivoted at its upper end within the housing and adapted to be extended through one side thereof to indicate the intended direction of travel of the vehicle, a closure for the side of the housing through which the arm extends, said closure comprising an upper closure member pivoted at its upper end to the housing, and a lower closure member secured to said arm, said closure members being adapted to swing outwardly in unison with the arm and to unite when the arm is disposed within the housing to form a closure for the side of the housing through which said arm operates.

2. A direction indicator comprising an elongated rectangular housing adapted to be arranged vertically at the side of a vehicle, said housing having integrally formed front, rear and inner side walls and ends, ears projecting outwardly from the front and rear walls at the upper end of the housing, a pivotal closure section pivotally connected with said ears, the length of said closure section being substantially half the length of the housing, a pivotal semaphore arm in the housing, a pivotal connection between the housing, a pivotal connection between the upper end of the semaphore arm and the housing, means for extending said semaphore arm outwardly in different signaling positions, a lower closure section secured to the semaphore arm and adapted to cooperate with the pivotal closure section to form a closure for the open side of the housing, the edges of said closure sections when in closed position nesting within the front and rear walls of the housing.

JACOB GRANTER.
JACOB DAVIS.